US010803257B2

(12) United States Patent
Joo et al.

(10) Patent No.: US 10,803,257 B2
(45) Date of Patent: Oct. 13, 2020

(54) MACHINE TRANSLATION LOCKING USING SEQUENCE-BASED LOCK/UNLOCK CLASSIFICATION

(71) Applicant: Microsoft Technology Licensing, LLC, Redmond, WA (US)

(72) Inventors: Dong Kwon Joo, Renton, WA (US); Bhavishya Mittal, Bellevue, WA (US); Li Tian, Sammamish, WA (US); Prasidh Srikanth, Redmond, WA (US); Jürgen Eidt, Bellevue, WA (US); Neal Allen Stipe, Kirkland, WA (US); Marcus Andrew Taylor, Bonney Lake, WA (US); Fernando de la Garza Martínez, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/928,680

(22) Filed: Mar. 22, 2018

(65) Prior Publication Data

US 2019/0294684 A1 Sep. 26, 2019

(51) Int. Cl.

| | |
|---|---|
| ***G06F 40/58*** | (2020.01) |
| ***G06N 3/08*** | (2006.01) |
| ***G06N 3/04*** | (2006.01) |
| ***G06F 40/42*** | (2020.01) |
| ***G06F 40/44*** | (2020.01) |

(52) U.S. Cl.

CPC .............. *G06F 40/58* (2020.01); *G06F 40/42* (2020.01); *G06F 40/44* (2020.01); *G06N 3/0445* (2013.01); *G06N 3/08* (2013.01); *G06N 3/0454* (2013.01)

(58) Field of Classification Search

CPC ...... G06F 17/27; G06F 17/2785; G06F 17/28; G06F 9/454; G06F 17/289

See application file for complete search history.

(56) References Cited

U.S. PATENT DOCUMENTS

| | | | |
|---|---|---|---|
| 6,035,121 | A | 3/2000 | Chiu et al. |
| 6,466,900 | B1 | 10/2002 | Lissauer et al. |

(Continued)

FOREIGN PATENT DOCUMENTS

| | | |
|---|---|---|
| EP | 1076861 B1 | 6/2005 |

OTHER PUBLICATIONS

"Does WPML support machine translation?", Retrieved From <<https://web.archive.org/web/20170614144313/https://wpml.org/faq/does-wpml-support-machine-translation/>>, Jun. 14, 2017, 2 Pages.

(Continued)

*Primary Examiner* — Thomas H Maung

(74) *Attorney, Agent, or Firm* — Christopher J. Volkmann; Kelly, Holt & Christenson, PLLC

(57) ABSTRACT

A software input string is received and tokenized into a sequence of tokens. The sequence of tokens is applied to a trained sequence-dependent lock/unlock classifier so that each of the tokens is classified as a token that should be locked, or remain unlocked, for subsequent translation. The software input string is converted to a converted string, in which the locked tokens are identified and the converted string is submitted for machine translation. A machine translation result is received and converted so that the locked tokens are replaced in the machine translation result, to obtain a translated software string.

20 Claims, 9 Drawing Sheets

100

TRANSLATION LOCK COMPUTING SYSTEM 102
TRANSLATION LOCK CLASSIFICATION SYSTEM 116
TOKEN IDENTIFICATION LOGIC 122
DATA STORE 126
CONTEXT-DEPENDENT TOKEN CLASSIFIER LOGIC 124
OTHER 128
PROCESSOR(S) / SERVER(S) 114
CLASSIFIED STRING (E.G., TOKEN(S) AND CLASSIFICATION INDICATOR(S)) 136
OTHER 120
STRING CONVERSION LOGIC 118
LOCKING LOGIC 130
UNLOCKING LOGIC 132
OTHER 134
DATA STORE 133
STRING ID 135
LOCKED TOKEN DATA 137
OTHER 139
SOFTWARE INPUT STRING 104
TRANSLATED STRING 112
CONVERTED STRING (E.G., STRING WITH LOCKED TOKEN(S)) 106
MACHINE TRANSLATION RESULT 110
MACHINE TRANSLATION SYSTEM 108

(56) References Cited

U.S. PATENT DOCUMENTS

| | | | | |
|---|---|---|---|---|
| 7,209,875 | B2 | 4/2007 | Quirk et al. | |
| 7,711,546 | B2 | 5/2010 | Mola Marti et al. | |
| 8,219,907 | B2 | 7/2012 | Kohlmeier et al. | |
| 9,747,284 | B2 | 8/2017 | Marciano et al. | |
| 9,778,929 | B2 | 10/2017 | Joo | |
| 10,229,113 | B1 | 3/2019 | Wiggins et al. | |
| 2005/0149315 | A1* | 7/2005 | Flanagan | G06F 17/2229 704/2 |
| 2011/0307241 | A1* | 12/2011 | Waibel | G10L 15/265 704/2 |
| 2016/0140643 | A1* | 5/2016 | Nice | G06F 16/313 705/26.7 |
| 2016/0162477 | A1* | 6/2016 | Orsini | G06Q 30/0217 704/2 |
| 2016/0371287 | A1 | 12/2016 | Travieso et al. | |
| 2017/0060844 | A1* | 3/2017 | He | G06F 16/3329 |

OTHER PUBLICATIONS

"Bidirectional Recurrent Neural Networks", Retrieved From: https://web.archive.org/web/20171112174601/https://en.wikipedia.org/wiki/Bidirectional_recurrent_neural_networks, Nov. 12, 2017, 3 Pages.

"International Search Report and Written Opinion issued in PCT Application No. PCT/US2019/021954", dated Jun. 7, 2019, 11 Pages.

* cited by examiner

MACHINE TRANSLATION LOCKING USING SEQUENCE-BASED LOCK/UNLOCK CLASSIFICATION

BACKGROUND

Computing systems are currently in wide use. Some computing systems are used across geographic areas that have different native languages. Therefore, some computing systems undergo translation, or localization, in which parts of the software (such as software resources) are translated or localized.

Machine translation systems are systems that automatically translate an input string, that is provided in a source language, into an output string, that is in a target language. However, when software is provided as the input string to the machine translation system, for translation or localization, some challenges are presented. For instance, when software resources are to be translated or localized, those resources may include strings or substrings that are not to be translated. Those strings or substrings may, for instance, include function-related text, such as placeholders, HTML tags, attribute names, application-specific keywords, etc. If those strings or substrings are translated, this can cause functional breaks in the software which may inhibit users from using certain software features.

Some current systems use manual processes. People attempt to manually identify which strings or substrings should be locked from translation (e.g., not translated or localized). This, of course, is very cumbersome, and time consuming, as well as costly. It is also relatively error prone. Further, if there are any changes in the resources or software that is to be translated, the manual process must be extended or repeated.

Another current approach attempts to list all possible issue areas for a piece of software, in each knowledge domain, and identify portions in that knowledge domain that are to be locked using a deterministic approach. This has several problems as well. It is very difficult to list all the issues, exhaustively, for a piece of software and the deterministic approach cannot cover all possible cases for each issue.

Another current approach is simply to submit the entire software resource to a machine translation system, without any attempt to lock certain portions of it from translation. This often leads to over-translation in which certain parts of the software, which should have been locked, are actually translated.

The discussion above is merely provided for general background information and is not intended to be used as an aid in determining the scope of the claimed subject matter.

SUMMARY

A software input string is received and tokenized into a sequence of tokens. The sequence of tokens is applied to a trained sequence-dependent lock/unlock classifier so that each of the tokens is classified as a token that should be locked, or remain unlocked, for subsequent translation. The software input string is transformed to a converted string, in which the locked tokens are identified and the converted string is submitted for machine translation. A machine translation result is received and converted so that the locked tokens are replaced in the machine translation result, to obtain a translated software string.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
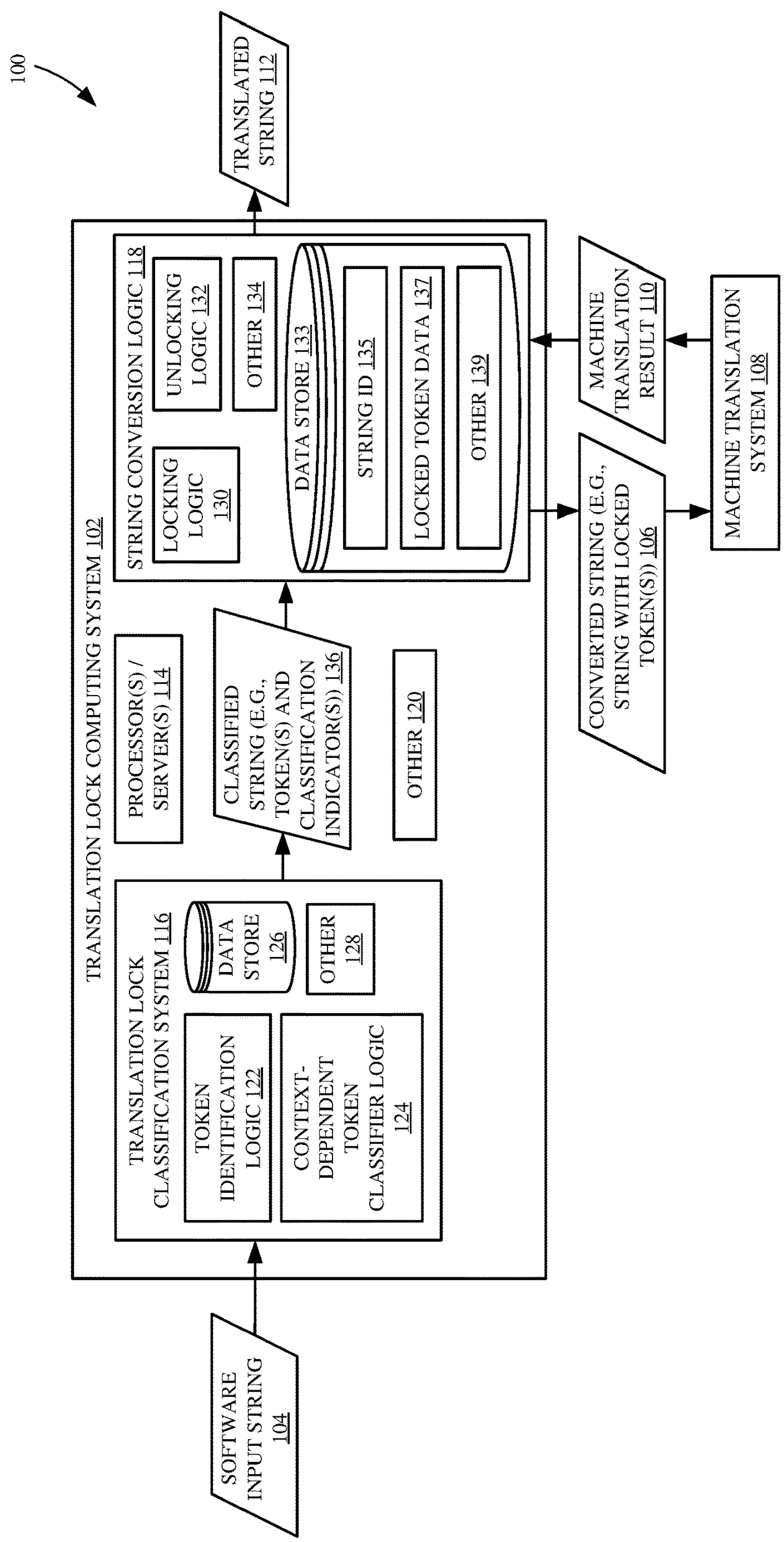
FIG. 1 is a block diagram of one example of a translation lock architecture.

FIG. 1 is a block diagram showing one example of a translation lock architecture 100. Architecture 100 includes translation lock computing system 102, that receives software input string 104 for translation, or localization. It converts the software input string 104 into a converted string 106 (such as a string with locking indicators indicating which tokens on the software input string 104 are to be locked), that is provided to machine translation system 108. Machine translation system 108 translates the converted string, given the locking indicators, and provides a machine translation result 106. The machine translation result 106 can be processed by translation lock computing system 102 and output as a translated software string 112.

In the example shown in FIG. 1, translation lock computing system 102 illustratively includes one or more processors or servers 114, translation lock classification system 116, string conversion logic 118, and it can include other items 120. Translation lock classification system 116, itself, illustratively includes token identification logic 122, context-dependent token classifier logic 124, data store 126, and it can include other items 128. String conversion logic 118, itself, illustratively includes locking logic 130, unlocking logic 132, and data store 133 (which can include string identifier 135 and locked token data 137 and other items 139). String conversion logic 118 can include other items 134 as well. FIG. 1 also shows that, in one example, translation lock classification system 116 generates classified strings 136, which can be tokens and classification indicators indicating whether each of the tokens should be locked for machine translation, or unlocked. Before describing the overall operation of architecture 100 in more detail, a brief overview of some of the items in architecture 100, and their operation, will first be provided.

In the example shown in FIG. 1, translation lock computing system 102 receives software input string 104. In the example, it will be assumed that software input string 104 is a software resource, but it can be any piece of software code that is to be translated or localized. System 102 then analyzes string 104 to identify which portions of the string should be locked for translation (i.e., not translated).

Translation lock classification system 116 receives string 104 and performs the operations needed to identify which parts of the string should be locked. In doing so, token identification logic 122 identifies different tokens in string 104 and outputs a token sequence representing string 104. The tokens can take different forms, such as n-grams, words, characters, etc. Token classifier logic 124 then performs classification on the sequence of tokens that represents string 104 to identify which tokens should be locked for translation. It generates a classified string 136 which can include the sequence of tokens and classification indicators indicating which of those tokens are to be locked. String conversion logic 118 then converts the classified string 136 so that it is in a form where it can be translated by machine translation system 108. In one example, locking logic 130 operates on the tokens that are to be locked. As is described in greater detail below with respect to one example, locking logic 130 generates a converted string 106 by identifying the tokens that are to be locked and removing those tokens and replacing them with a token that will not be translated (such as a hashtag or other token). Converted string 106 (such as a string with the locked tokens removed and replaced with a token that will not be translated) is provided to machine translation system 108. A string identifier 135, and token data 137 identifying the tokens that were removed, are stored in data store 330. Machine translation system 108 then translates the converted string 106 by translating the unlocked tokens, and not translating the locked tokens (e.g., the hashtag or series of hashtags or another locked token). The machine translation result 110 is returned to string conversion logic 118. Unlocking logic 132 then accesses data store 133 to obtain the original tokens that were removed from the string, and replaces the non-translated tokens in the machine translation results 110, with the tokens that were removed by locking logic 130. Thus, the machine translation result 110 now includes the non-translated tokens that were identified by translation lock classification system 116. The result is translated string 112, which is output by system 102.

Figure 2:
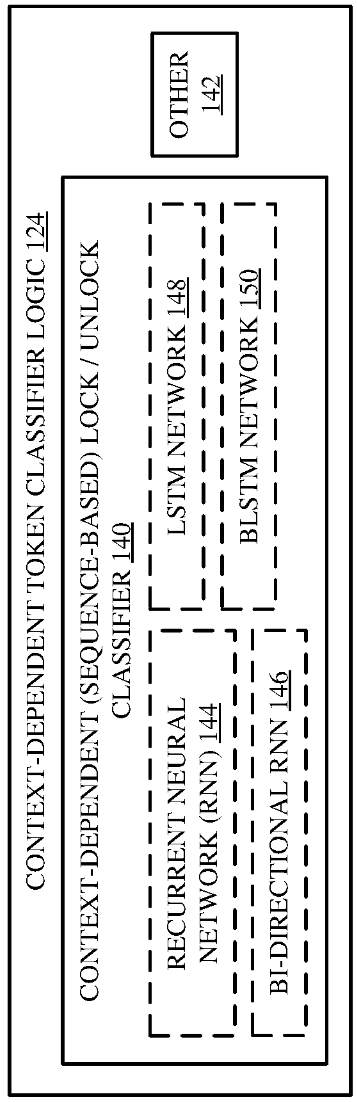
FIG. 2 is a block diagram showing a plurality of different examples of a context-dependent (sequence-based) lock/unlock classifier.

FIG. 2 is a block diagram showing a number of different examples of context-dependent token classifier logic 124, in more detail. Context-dependent token classifier logic 124 illustratively includes a context-dependent (sequence-based) lock/unlock classifier 140, and it can include other items 142. Classifier 140 can be any of a variety of different classifiers, such as a recurrent neural network (RNN) 144, a bi-directional recurrent neural network (BRNN) 146, a Long Short Term Memory (LSTM) network 148, or a bi-directional Long Short Term Memory (BLSTM) network 150. In the example, the various networks 144-150 are shown in dashed lines to indicate that they need not all be present. Instead, even a single network 144-150 can be used as the context-dependent (sequence-based) lock/unlock classifier 140.

It will be appreciated that a bi-direction RNN uses a finite sequence of nodes to predict or label each element of a sequence based upon the element's past and future contexts. In one example, two different RNNs are concatenated, one of which processes the input sequent in a first direction (such as left-to-right) and the other of which processes the input sequence in the opposite direction (e.g., right-to-left). The outputs are combined to predict a label for each element of the input sequence, given both its right and left contexts.

It will also be appreciated that recurrent neural networks can be less effective in processing long sequences due to the vanishing gradient problem in which the errors propagating from layer to layer shrink exponentially with the number of layers in the network. LSTM networks are a form of RNN that addresses this problem (or a set of RNNs that address this problem). As will be appreciated, LSTM networks work better in understanding long data sets, relative to RNNs. This is because LSTM networks perform better in learning long range dependencies in a sequence (e.g., where one token in a sequence is dependent on another token in a sequence that is separated from the first token one or more additional tokens, in either direction in the sequence). Thus, while the different types of classifiers work somewhat differently, great improvements can be obtained using any of an RNN, BRNN, LSTM or BLSTM as classifier 140.

Figure 3A:
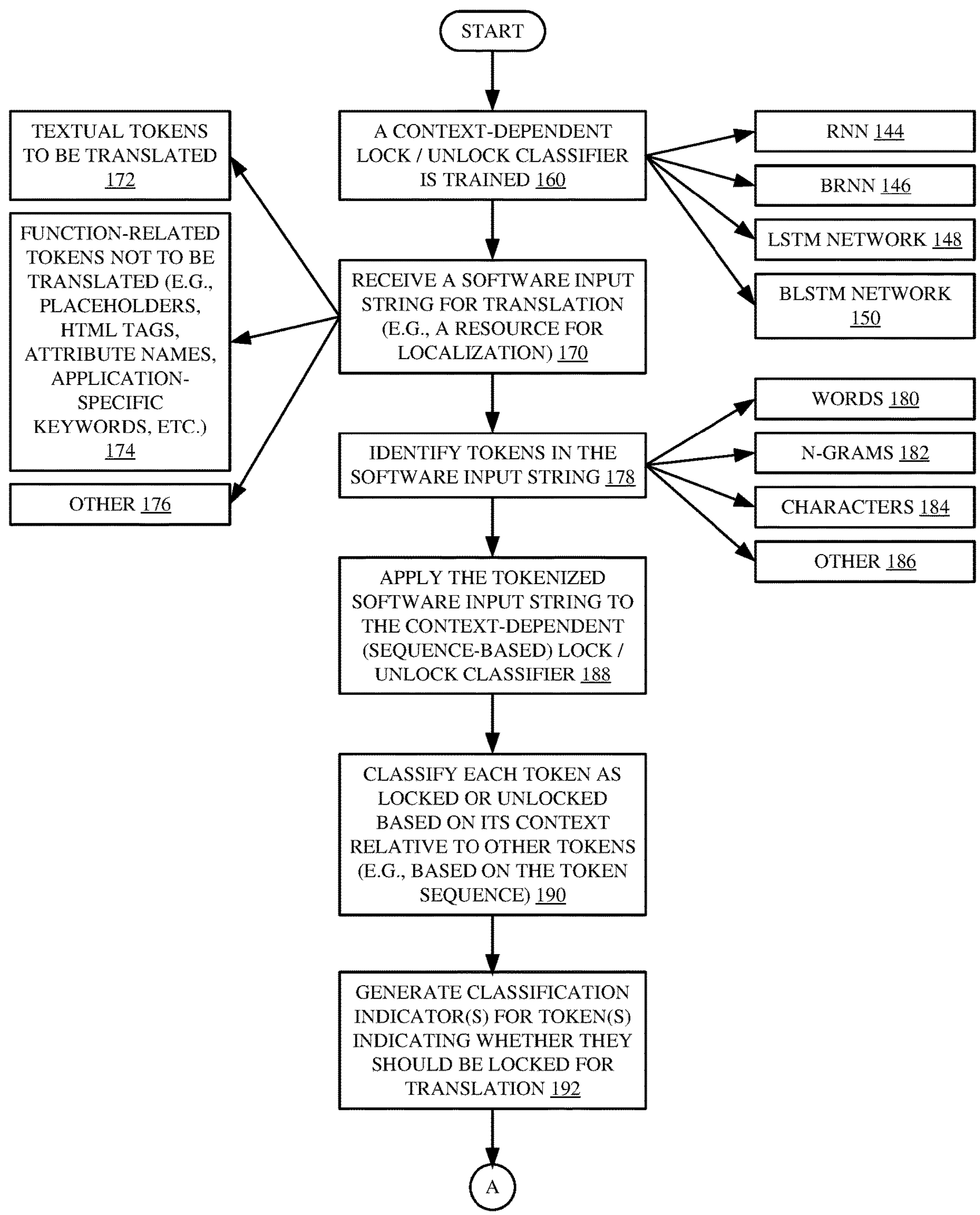
FIGS. 3A and 3B (collectively referred to herein as FIG. 3) show a flow diagram illustrating one example of the operation of the architecture illustrated in FIG. 1 in translating a software input string.
Figure 3B:
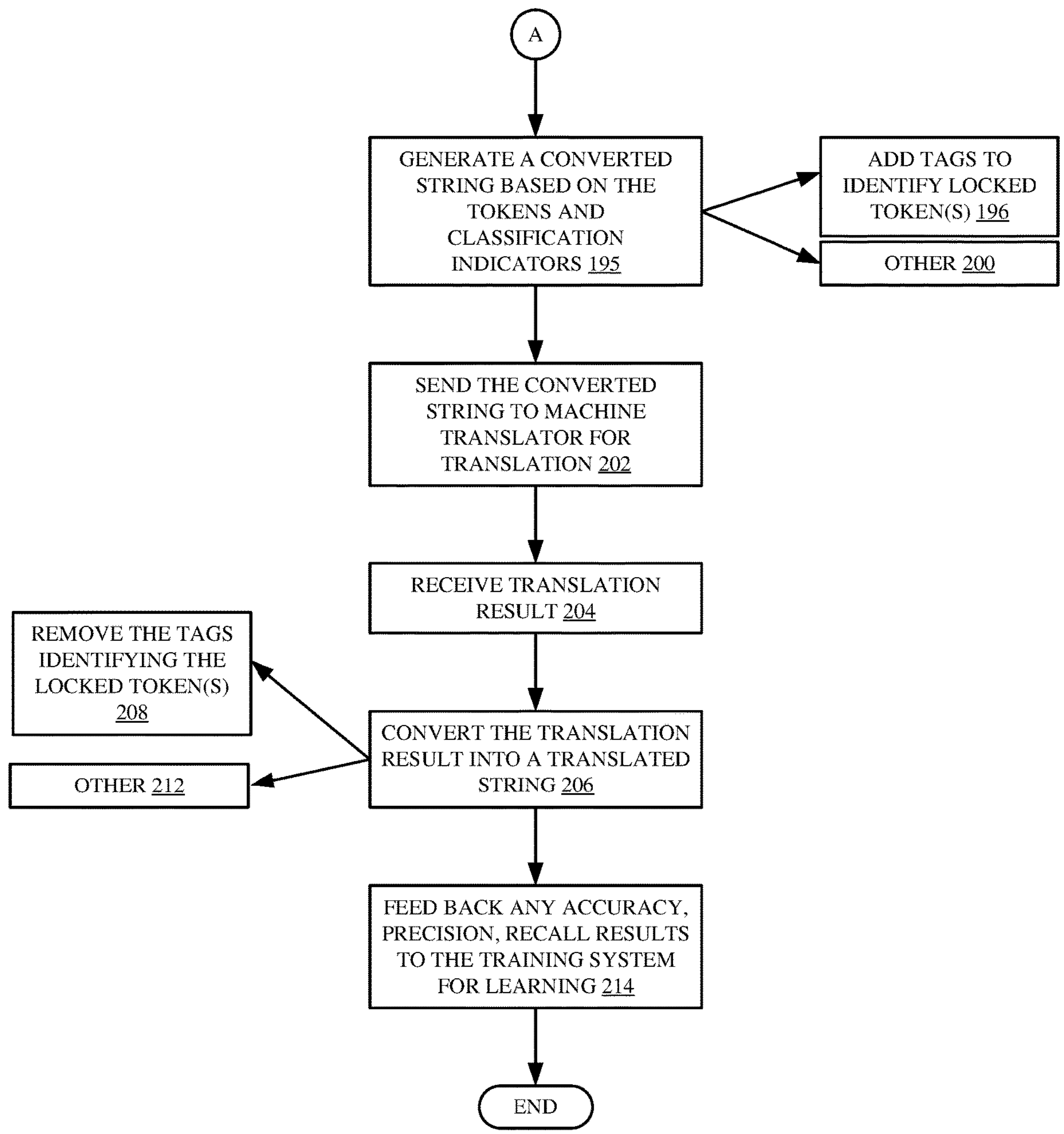

FIGS. 3A and 3B (collectively referred to herein as FIG. 3) show a flow chart illustrating one example of the operation of architecture 100, shown in FIG. 1, in identifying which tokens in the software input string 104 are to be locked for translation, and in generating the translated string 112. FIGS. 1-3 will now be described in conjunction with one another.

It is first assumed that a context-dependent (sequence-based) lock/unlock classifier 140 has been trained and is operational. This is indicated by block 160 in the flow diagram of FIG. 3. One example of training a context-dependent (sequence-based) lock/unlock classifier 140 is discussed below with respect to FIGS. 4 and 5. In one example, the classifier can be a recurrent neural network 144, a bi-directional recurrent neural network 146, a Long Short Term Memory network (LSTM network) 148, or a bi-directional LSTM network 150.

Translation classification system 116 then receives a software input string 104 for translation (e.g., a resource that is provided for localization). This is indicated by block 170 in the flow diagram of FIG. 3. In one example, the software input string 104 can include textual tokens that are to be translated. This is indicated by block 172. The software input string 104 can also, however, include function-related tokens that are not to be translated. This is indicated by block 174. Some examples of these tokens include placeholders, HTML tags, attribute names, application-specific keywords, etc. The software input string 104 can include other items 176 as well.

Token identification logic 122 then identifies the sequence of tokens in the software input string 104. This is indicated by block 178 in FIG. 3. The tokens can include such things as words 180, n-grams (or other sequences of words) 182, characters 184, or the tokens can be made up of other items 186.

Once the tokens are identified, the sequence of tokens is provided or applied to the context-dependent (sequence-based) lock/unlock classifier 140. This is indicated by block 188 in the flow diagram of FIG. 3. Each token is then classified as being locked or unlocked based upon its context, relative to other tokens in the token sequence representing the software input string 104. This is indicated by block 190. That is, each token is classified, indicating that it should be locked for machine translation, or unlocked so that it can be translated, based upon the token sequence identified in software input string 104.

Figure 3C:
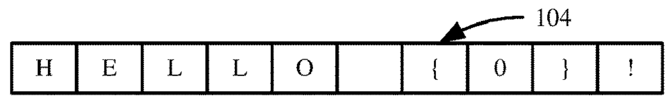
FIGS. 3C-3I show examples of tokenized strings.

An example may be helpful. Assume first that token identification logic 122 is configured to identify the tokens as individual characters in the input string 104. Assume also, for instance, that the software input string is that illustrated in FIG. 3C"; and assume also that the characters "{0}" in the input string represent a software placeholder that is not to be translated. Thus, each box in the input string shown in FIG. 3C represents one of the tokens that is identified by token identification logic 122. Applying this token sequence to the context-dependent (sequence-based) lock/unlock classifier 140 will thus identify the software placeholder "{""0""}" as tokens that are to be locked for classification. Classifier 140 will thus generate a classification indicator for those tokens, indicating that they should be locked for translation. Generating the classification indicator for each of the tokens is indicated by block 192 in the flow diagram of FIG. 3.

It will also be appreciated that, in another example, the token identification logic 122 can identify the tokens as words as well as characters. In that case, the word "hello" may be identified as one token, and then the character sequence "{0}" may be identified as another token, as an example. The token "hello" would thus be identified as a token that is to be translated, while the token "{0}" would be identified as a token that is not to be translated (or that is locked for translation).

In one example, the context-dependent (sequence-based) lock/unlock classifier 140 is trained for increased accuracy in analyzing sequence data. By context-dependent or (sequence-based) it is meant that the classifier 140 classifies whether a token (e.g., a character or word) should be translated, or locked from translation, considering which characters or words (e.g., tokens) existed in the past or the future in the string relative to the token being processed. Another example may be helpful to illustrate this.

Assume, for instance, that the software input string 104 is "<table border: none". Also, assume that the token identification logic 122 identifies words, and also special characters, as individual tokens. In that case, the software input string 104 will be tokenized as shown in FIG. 3D, with the designations T0-T4 each representing an individual token.

Figure 3D:
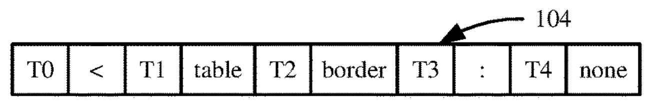
Figure 3E:
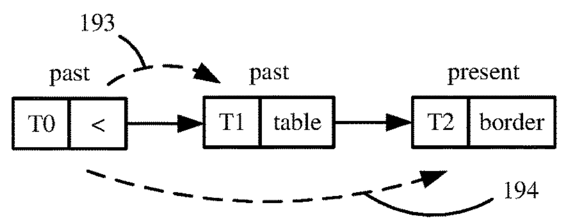
Figure 3F:
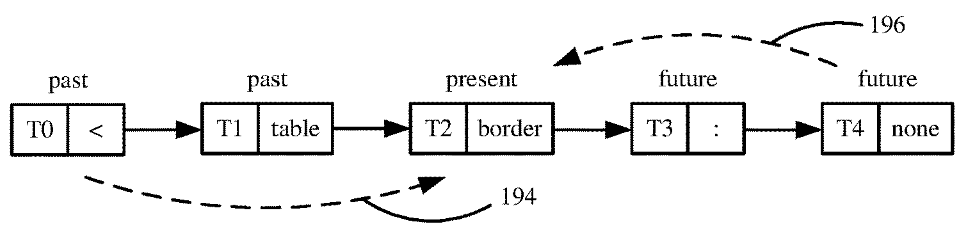

Assuming that the software input string 104 is that shown in FIG. 3D, classifier 140 can generate an output indicating that the token T1 "table" is an HTML tag (and should therefore be locked from translation) based on the context that token T0 "<" is a prior event. This context or sequence-dependence is illustrated by arrow 193 in FIG. 3E. Arrow 194 indicates that when the token that is presently being processed is token T2, "border", then the context, or sequence of tokens that came before it, is considered in classifying it as locked or unlocked. Arrow 194 shows that the token T0 "<" (i.e., the token that is two tokens earlier in the sequence than the token T2 that is currently being processed, when the sequence is considered in a left-to-right direction) impacts the token "border" indirectly through the token "table". This type of long distance dependence on prior tokens is considered by classifier 140.

However, in one example, classifier 140 is also bi-direction, in that it does not only consider the sequence of tokens that preceded a present token (the token that is currently being processed) but it also considers future tokens, or the sequence of tokens that come after the present token. Therefore, in the example where classifier 140 is a bi-directional classifier, it considers the sequence of tokens not only in the first direction (e.g., left-to-right) but also in the opposite direction (e.g., right-to-left). Thus, in the example shown in FIG. 3F, the fact that the token "border" is in front of the token ":" increases the confidence with which the token "border" can be identified as an attribute name. Then, as indicated by arrow 196, the fact that the token "border" is in front of the token ":" which is, itself in front of the token "none" further enhances the confidence with which the token "border" can be identified as an attribute name (and thus classified as a token that is locked from translation).

Regardless of whether classifier 140 is a uni-directional classifier, or a bi-directional classifier, it illustratively identifies whether each token should be locked for translation, or unlocked for translation, and it generates lock/unlock indicators that indicate this classification result based on the context of the token (or the sequence of tokens). In one example, the lock/unlock classifiers only identify tokens that are to be locked, or tokens that are to be unlocked, and it is assumed that the other tokens fall into the opposite classification. For instance, if it generates indicators identifying only tokens that are to be locked, then all tokens that do not have indicators are assumed to be unlocked, and vice-versa. This is just one example, and indicators can be generated for every token as well.

Once the classification indicators are generated for the tokens in the software input string 104, then the classified strings and their classification indicators (136 in FIG. 1) are provided to string conversion logic 118 which generates a converted string based upon the tokens and classification indicators. This is indicated by block 195 in the flow diagram of FIG. 3. In one example, the conversion removes the locked tokens, so that they are not even provided to machine translation system 108. However, the locked tokens may provide context for the machine translation system so that removing them may degrade the accuracy of the translation. Therefore, in another example the conversion adds tags around the locked tokens, identifying them as being locked. This is indicated by block 196 in the flow diagram of FIG. 3. Data representing the added tags, such as a string identifier 135 and token data 137, which identifies the tagged tokens and where in the string they were tagged, can then be stored in data store 133. This is indicated by block 199. In another example, this information need not be stored. The converted string can be generated in other ways as well, and this is indicated by block 200.

Figure 3G:
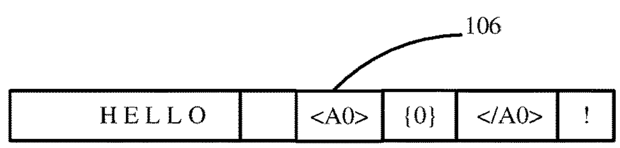

An example may also be helpful to further illustrate this. Returning again to the example in which the input string 104 is that illustrated in FIG. 3C, now assume that the tokens "hello" and "!" has been classified as tokens that are to be translated, and the token "{0}" has been identified as a token (or sequence of tokens) that is to be locked for translation. In that case, the converted string is generated by tagging the locked token (or sequence of tokens) with tags indicating that they are not to be translated. One example of this is shown in FIG. 3G, which shows an example of a converted string 106 which has the locked token tagged on both sides.

Once the converted string is generated, it is illustratively sent to machine translation system 108 where the unlocked tokens will be translated. Sending the converted string to machine translation system 108 is indicated by block 202 in the flow diagram of FIG. 3.

Figure 3H:
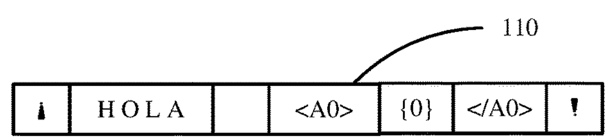

In one example, the translation system can be a remote translation service which performs translation on the converted string and then returns a translation result. It can also be a local machine translator or other type. Receiving the translation result at string conversion logic 118 is indicated by block 204 in the flow diagram of FIG. 3. One example of a translation result that is received from machine translation system 108, for the example of the converted string 106 shown in FIG. 3G, is illustrated in FIG. 3H.

Figure 3I:
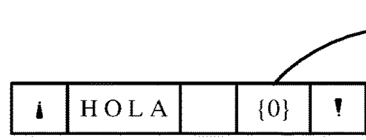

Once the translation result 110 is received from machine translation system 108, then unlocking logic 132 in string conversion logic 118 converts the translation results into a translated string, as indicated by block 206. In one example, unlocking logic 132 locates and removes the tags that were used to identify the locked token(s). This is indicated by block 208. This can be done by examining the translation result 110, or by accessing the data store 133 (if information was stored there) to find the locations where tags were inserted in the string prior to its translation and converting the translation results 110 to a translated string 112 by removing the tags. Thus, the final, translated string 112 is translated to the target language, but the tokens that were locked remain untranslated. An example of this is illustrated in FIG. 3I in which the tags in FIG. 3H have now been removed. The conversion can be done in other ways as well, and this is indicated by block 212.

It should also be noted that, in one example, translated string 112 can be examined for accuracy. The translated string 112 can be tested or otherwise analyzed to identify errors, or to indicate accuracy, precision and/or recall in the locking process described above. The result of that analysis can also be fed back to a training system that is used to train or improve classifier 140 (such as a machine learning system or another training system, one example of which is described below with respect to FIGS. 4 and 5). The classifier 140 can then be adapted to improve its accuracy. Feeding back any accuracy, precision, or recall results to the training system, for continued learning, is indicated by block 214 in the flow diagram of FIG. 3.

Figure 4:
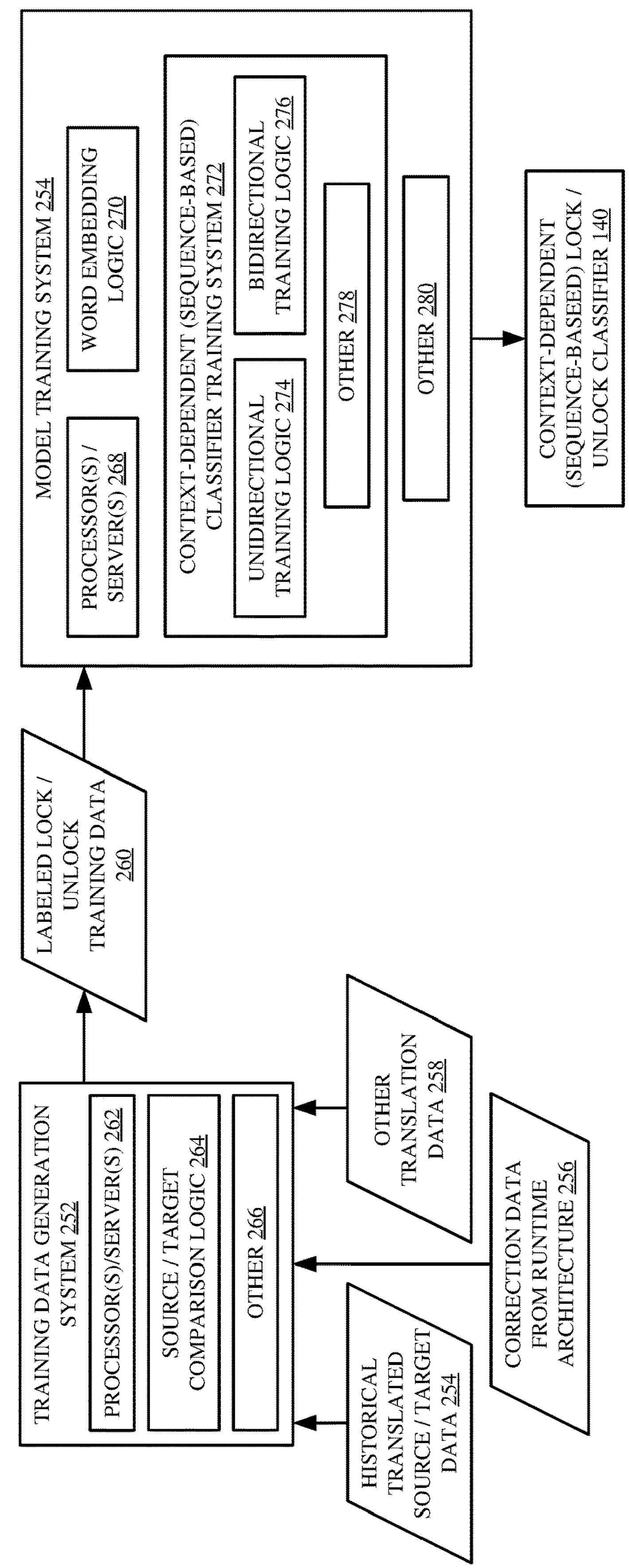
FIG. 4 is a block diagram of one example of a training system architecture for training a context-dependent (sequence-based) lock/unlock classifier.

FIG. 4 is a block diagram showing one example of a training system architecture 250. Architecture 250 illustratively includes training data generation system 252 and model training system 254. Training data generation system 252 illustratively accesses a variety of different types of training data. For instance, it can include historical, translated source and target data 254. Data 254 can include a set of parallel data with source data, and corresponding translated target data that has been translated into the target language. Also, where the translated string 112 is analyzed for accuracy, correction data can be generated to correct any errors in the translated string 112. This type of correction data from the runtime architecture, illustrated by block 256 in FIG. 4, can also be fed back to the training data generation system 252.

There can be a wide variety of other types of lock/unlock training data as well, and this is indicated by block 258. In one example, for instance, different types of build engines can use validation logic to validate whether a translated text conforms to the translation instructions that were provided, along with the source text that is to be translated. The output of the validation process may be a set of markups that are used to mark up the translated text, so that the errors in the translation process can be identified. This type of information can be used by training data generation system 252 as well.

Based upon the training or other data received, training data generation system 252 generates labeled lock/unlock training data 260. The labeled lock/unlock training data 260 is provided to model training system 254 that trains the context-dependent (sequence-based) lock/unlock classifier 140 and outputs the trained classifier 140. Before describing the overall operation of architecture 250 in more detail, a brief description of some of the items in architecture 250, and their operation, will first be provided.

In the example illustrated in FIG. 4, training data generation system includes one or more processors or servers 262, source/target comparison logic 264, and it can include a wide variety of other items 266. Model training system 254 illustratively includes one or more processors or servers 268, word embedding logic 270, context-dependent (sequence-based) classifier training system 272 which, itself, can include uni-directional training logic 274, bi-directional training logic 276, and it can include other items 278. Model training system 274 can also include a wide variety of other logic or items 280 as well.

Source/target comparison logic 264 in training data generation system 252 illustratively receives the historical translated source and target data 254 and compares the source strings to the translated target strings. It can identify which tokens in those two strings are the same (e.g., which tokens have not been translated). It can use this information, as well as the other information it receives, to label the training data by identifying tokens that are not to be translated from the source language to the target language (those that are to be locked for translation).

The labeled lock/unlock training data 260 is received by model training system 254. Word embedding logic 270 illustratively implements a language modeling and feature learning technique in which words or phrases are encoded so that they can be used by context-dependent classifier training system 272. In the example in which word embedding logic 270 is used, words or phrases in the labeled lock/unlock training data 260 are illustratively mapped to vectors of real numbers. In concept, this involves a mathematical embedding from a space with one dimension per word to a continuous vector space with a lower dimension. Word embedding quantifies and categorizes semantic similarities between linguistic items based on their distributional properties in large samples of language data. Once encoded using word embedding logic 270, the data is passed to context-dependent (sequence-based) classifier training system 272. In one example, uni-directional training logic 274 trains a RNN or a LSTM network so that it is context-dependent (or sequence-dependent) in one direction (such as left-to-right). In another example, however, bi-directional training logic 276 is used so that the context-dependent (sequence-based) classifier 140 is trained to account for context in both directions (e.g., left-to-right and right-to-left).

Figure 5:
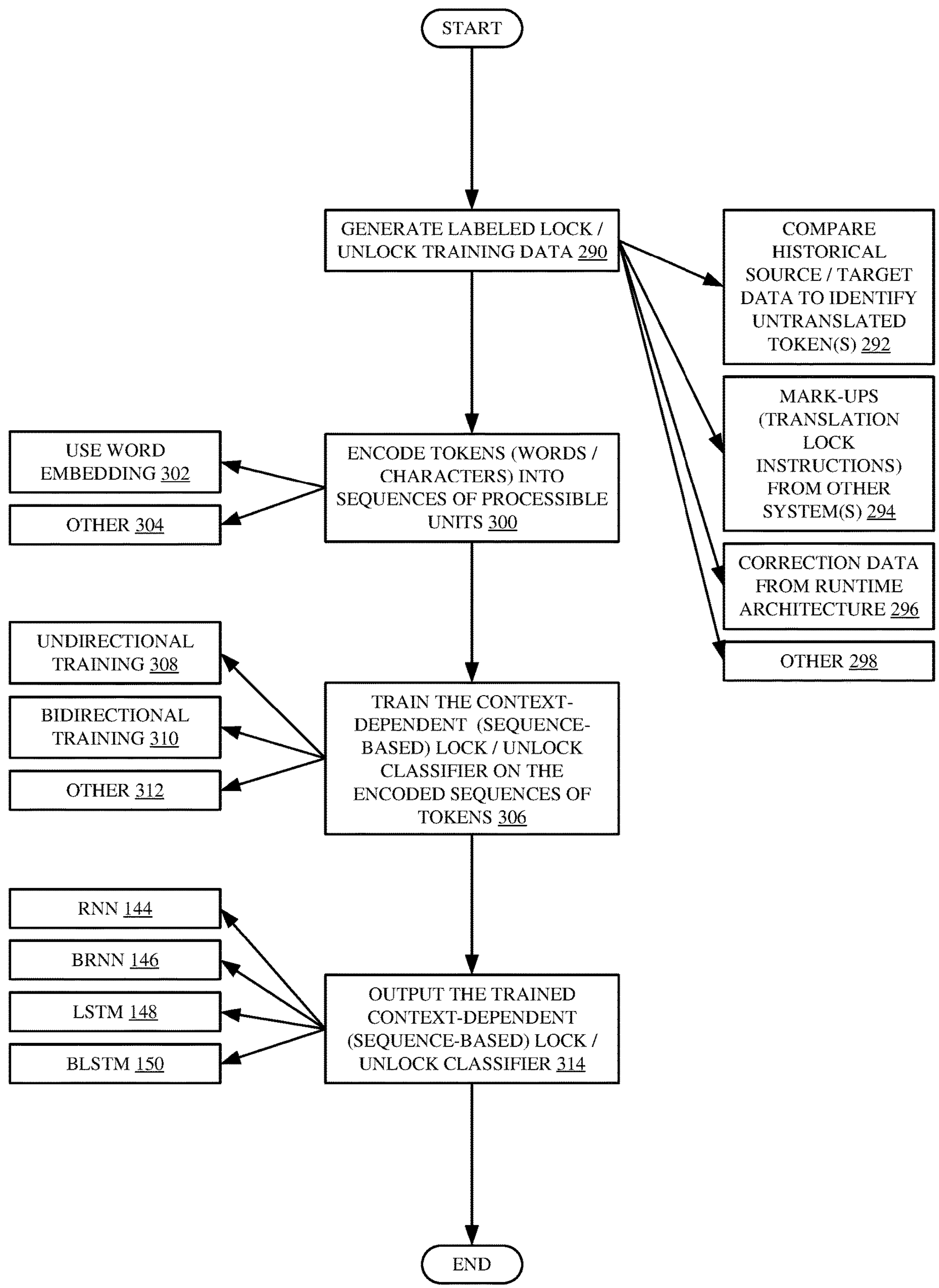
FIG. 5 is a flow diagram illustrating one example of the operation of the architecture illustrated in FIG. 4 in training a context-dependent (sequence-based) lock/unlock classifier.

FIG. 5 is a flow diagram illustrating one example of the operation of training system architecture 250 shown in FIG. 4. FIGS. 4 and 5 will now be described in conjunction with one another.

Training data generation system 252 first generates labeled lock/unlock training data 260. This is indicated by block 290 in the flow diagram of FIG. 5. This can be done, as discussed above, by source/target comparison logic 264 comparing historic source/target data to identify untranslated tokens. This is indicated by block 292. It can be done by obtaining markups (translation lock instructions) from other systems. This is indicated by block 294. It can be done by obtaining correction data from the runtime architecture, as described above. This is indicated by block 296. The labeled lock/unlock training data 260 can be generated in other ways as well, and this is indicated by block 298.

The tokens (words, characters, etc.) in the labeled lock/unlock training data 260 is then encoded into sequences of processable units, that can be processed within model training system 254. This is indicated by block 300 in the flow diagram of FIG. 5. In one example, word embedding logic 270 is used to implement word embedding to encode the words using word embedding techniques. This is indicated by block 302. The tokens can be encoded in other ways as well, and this is indicated by block 304.

Context-dependent (sequence-based) classifier training system 272 then trains the context-dependent (sequence-based) lock/unlock classifier 140 based upon the encoded sequences of tokens. This is indicated by block 306. The training can be performed by uni-directional training logic 274 to accomplish uni-directional training 308. It can also be performed by bi-directional training logic 276 to obtain bi-directional training 310. The training can be performed in other ways 312 as well.

Once the classifier 140 is trained, the trained classifier 140 is output by model training system 254. This is indicated by block 314. As discussed above, the trained lock/unlock classifier 140 can be a RNN 144, a bi-directional RNN 146, an LSTM network 148, or a bi-directional LSTM network 150. Any or all of these are contemplated herein.

Thus, the present discussion greatly improves the machine translation process by providing an approach to identifying strings or substrings in software that is to be translated or localized and to proactively protect them during the machine translation process. The system uses recurrent neural network or LSTM networks (or bi-directional versions of them) to learn from data without relying on domain knowledge or feature engineering. The classifier then performs sequence-to-sequence learning for binary classification (lock/unlock classification) and can provide a closed loop feedback system to continuously improve classifier performance using machine learning. All of this greatly enhances the translation process and thus greatly improves the computing system performance. Because it reduces over localization (over translation) of computing system resources, the resultant system performs better, with less errors.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
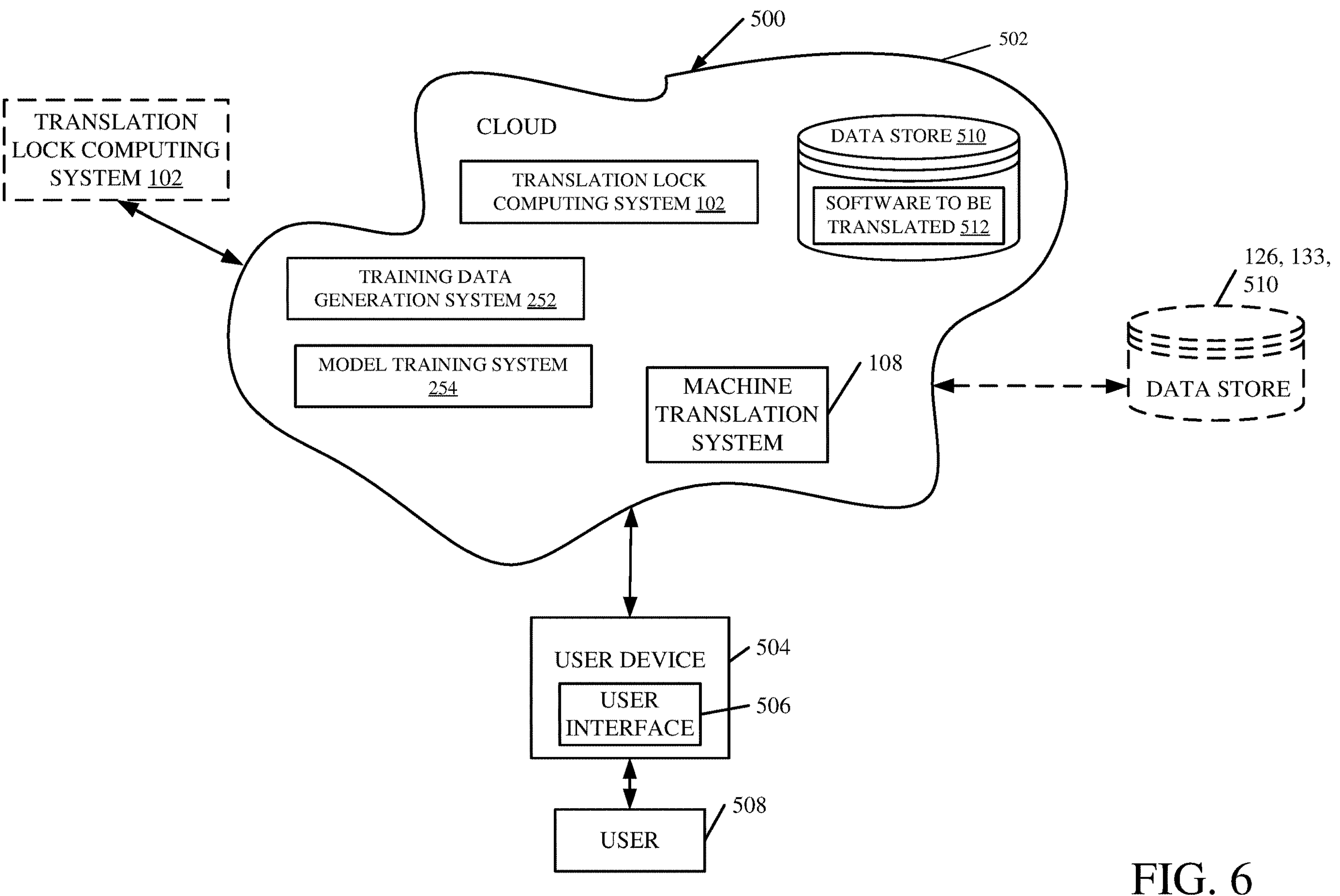
FIG. 6 is a block diagram showing one example of the architectures illustrated in FIGS. 1 and 4, deployed in a cloud computing architecture.

FIG. 6 is a block diagram of architectures 100 and 250, shown in FIGS. 1 and 4, except that the elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIGS. 1 and 4 and they are similarly numbered. FIG. 6 specifically shows that systems 100, 102, 252 and 254 can be located in cloud 502 (which can be public, private, or a combination where portions are public while others are private). Therefore, a user 508 can use a user device 504 to access those systems through cloud 502 (such as to initiate translation or localization of software 512 stored in data store 510, or to initiate training of a classifier 140 using systems 252 and 254, for example).

FIG. 6 also depicts another example of a cloud architecture. FIG. 6 shows that it is also contemplated that some elements of or systems can be disposed in cloud 502 while others are not. By way of example, data stores 126, 133, 510 can be disposed outside of cloud 502, and accessed through cloud 502. In another example, system 102 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 and/or 250, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
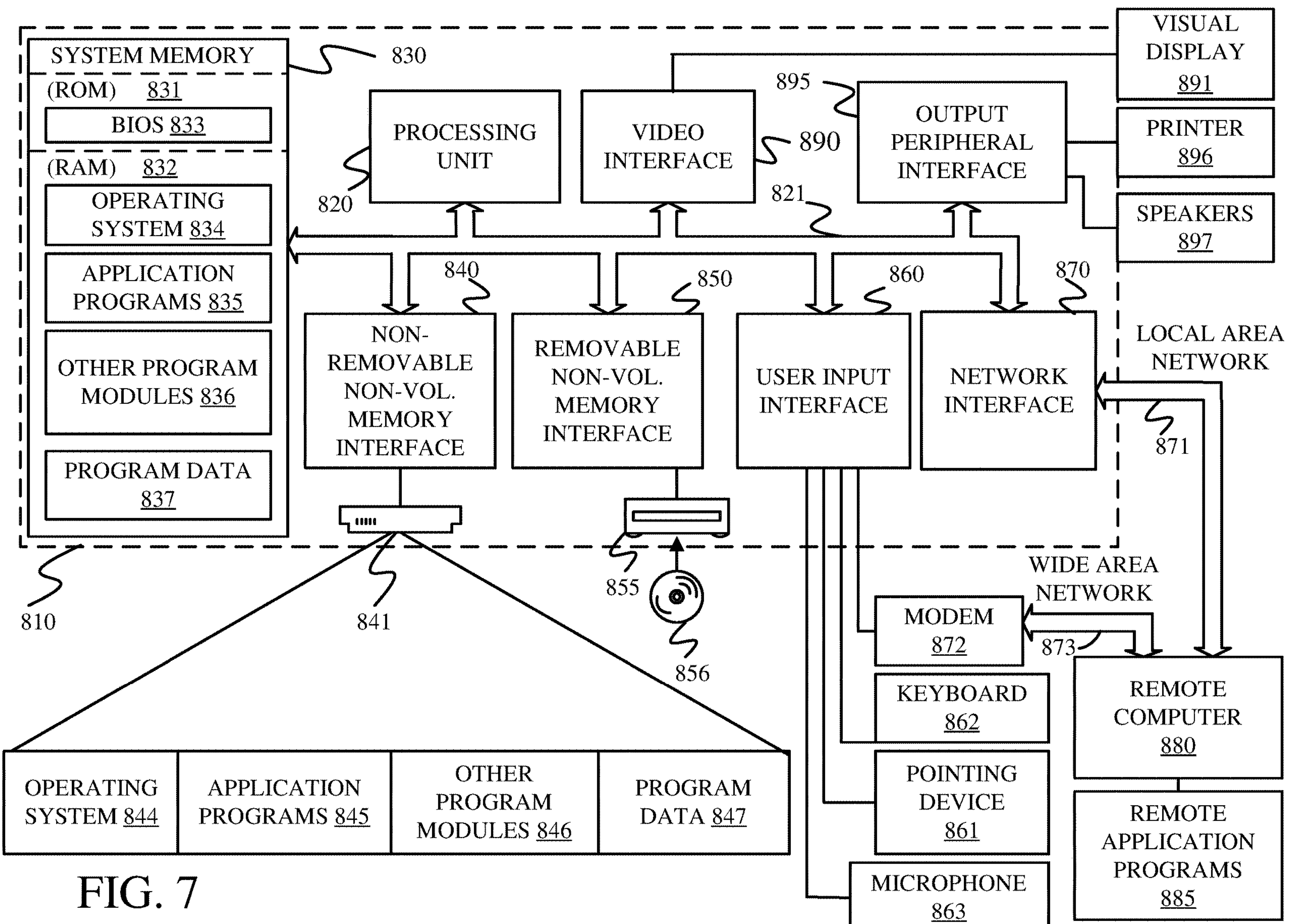
FIG. 7 is a block diagram showing one example of a computing environment that can be used in the architectures illustrated in the previous figures.

FIG. 7 is one example of a computing environment in which architectures 100 and/or 250, or parts of them, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 4 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

context-dependent token lock classifier logic that receives a representation of a software input string to be translated and classifies tokens in the representation of the software input string to identify a token to be locked for translation, and that generates a classified string, based on the representation of the software input string, with a classification indicator indicating that the identified token is to be locked for translation;

string conversion logic that converts the classified string into a converted string in which the identified token is identified so that it is locked for translation, based on the classification indicator, and that sends the converted string to a machine translation system; and unlocking logic that receives a machine translation result from the machine translation system and generates a translated software string, in which the identified token is untranslated, based on the machine translation result.

Example 2 is the computing system of any or all previous examples and further comprising:

token identification logic that receives the software input string and is configured to generate, as the representation of the software input string, a sequence of tokens in the software input string, in which the tokens in the software input string are identified.

Example 3 is the computing system of any or all previous examples wherein the context-dependent token lock classifier logic comprises:

a sequence-based lock/unlock classifier configured to classify each token in the sequence of tokens as a token to be locked or a token to be translated, based on at least one other token in the sequence of tokens, and to generate the classification indicator identifying the tokens classified as tokens to be locked.

Example 4 is the computing system of any or all previous examples wherein the sequence-based lock/unlock classifier comprises:

a recurrent neural network.

Example 5 is the computing system of any or all previous examples wherein the sequence-based lock/unlock classifier comprises:

a bi-directional recurrent neural network.

Example 6 is the computing system of any or all previous examples wherein the sequence-based lock/unlock classifier comprises:

a Long Short Term Memory (LSTM) network.

Example 7 is the computing system of any or all previous examples wherein the sequence-based lock/unlock classifier comprises:

a bi-directional Long Short Term Memory (BLSTM) network.

Example 8 is the computing system of any or all previous examples wherein the string conversion logic comprises:

locking logic configured to generate the converted string by tagging, in the classified string, the identified token with a predefined tag.

Example 9 is the computing system of any or all previous examples wherein the machine translation result comprises a translated version of the converted string with the identified token tagged by the predefined tag untranslated, and wherein the unlocking logic is configured to generate the translated software string by removing, in the translated version of the converted string, the predefined tag.

Example 10 is a computer implemented method, comprising:

receiving a representation of a software input string to be translated;

classifying tokens in the representation of the software input string to identify a token to be locked for translation;

generating a classified string, based on the representation of the software input string, with a classification indicator indicating that the identified token is to be locked for translation;

converting the classified string into a converted string in which the identified token is tagged so that it is locked for translation, based on the classification indicator;

sending the converted string to a machine translation system;

receiving a machine translation result from the machine translation system; and generating a translated software string, in which the identified token is untranslated, based on the machine translation result.

Example 11 is the computer implemented method of any or all previous examples and further comprising:

receiving the software input string; and generating, as the representation of the software input string, a sequence of tokens in the software input string, in which the tokens in the software input string are identified.

Example 12 is the computer implemented method of any or all previous examples wherein classifying tokens comprises:

classifying each token in the sequence of tokens as a token to be locked or a token to be translated, based on at least one other token in the sequence of tokens; and generating the classification indicator identifying the tokens classified as tokens to be locked.

Example 13 is the computer implemented method of any or all previous examples wherein classifying each token comprises:

classifying each token based on the at least one other token in the sequence of tokens using a recurrent neural network (RNN) classifier.

Example 14 is the computer implemented method of any or all previous examples wherein classifying each token comprises:

classifying each token based on the at least one other token in the sequence of tokens using a bi-directional recurrent neural network (BRNN) classifier.

Example 15 is the computer implemented method of any or all previous examples wherein classifying each token comprises:

classifying each token based on the at least one other token in the sequence of tokens using a Long Short Term Memory (LSTM) network classifier.

Example 16 is the computer implemented method of any or all previous examples wherein classifying each token comprises:

classifying each token based on the at least one other token in the sequence of tokens using a bi-directional Long Short Term Memory (BLSTM) network classifier Example 17 is the computer implemented method of any or all previous examples wherein converting the classified string into a converted string comprises:

generating the converted string by tagging, in the classified string, the identified token with a predefined tag.

Example 18 is the computer implemented method of any or all previous examples wherein the machine translation result comprises a translated version of the converted string with the identified token tagged by the predefined tag untranslated, and wherein generating the translated software string by removing, in the translated version of the converted string, the predefined tag.

Example 19 is a computing system, comprising:

a training data generation system that compares a source language computer software string to a target language computer software string, that is translated from a source language to a target language, to identify a sequence of tokens in the source language computer software string, and untranslated tokens in the target language computer software string, and that generates labeled training data indicative of the sequence of tokens in the source language computer software string, the target language computer software string and the identified, untranslated tokens;

word embedding logic that encodes the labeled training data;

a recursive neural network (RNN) classifier training system that trains a recursive neural network classifier to classify tokens in a source language computer software string as locked for translation or unlocked for translation, based on the sequence of tokens in the encoded, labeled training data.

Example 20 is the computing system of any or all previous examples wherein the RNN classifier training system comprises:

bi-directional training logic configured to train a bi-directional Long Short Term Memory (LSTM) network classifier to classify tokens in a source language computer software string as locked for translation or unlocked for translation, based on bi-directional token dependencies in the sequence of tokens in the labeled training data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, provide:

context-dependent token lock classifier logic configured to:

receive a software input string having an input sequence of tokens; and apply a machine-learning token classifier that:

classifies a first token in the input sequence of tokens as a token to be locked from translation or a token to be translated, based on a second token in the input sequence of tokens and relative positions of the first token and the second token;

classifies the second token in the input sequence of tokens as a token to be locked from translation or a token to be translated, based on at least one other token in the input sequence of tokens and relative positions of the second token and the at least one other token;

generates a classification indicator identifying tokens, in the input sequence of tokens, classified as tokens to be locked from translation; and generates a classified string, based on the software input string, including the classification indicator identifying the tokens to be locked from translation;

string conversion logic configured to:

convert the classified string into a converted string in which the identified tokens are identified so that they are locked from translation, based on the classification indicator; and send the converted string to a machine translation system; and unlocking logic configured to:

receive a machine translation result from the machine translation system; and generate a translated software string based on the machine translation result, wherein the identified tokens, in the translated software string, remain untranslated from the software input string.

2. The computing system of claim 1 wherein the instructions, when executed, provide:

a training data generation system configured to:

compare a source language computer software string to a target language computer software string, that is translated from a source language to a target language, to identify a sequence of tokens in the source language computer software string, and untranslated tokens in the target language computer software string;

generate labeled training data indicative of the sequence of tokens in the source language computer software string, the target language computer software string and the identified, untranslated tokens; and train the machine-learning token classifier based on the labeled training data.

3. The computing system of claim 1, wherein the instructions, when executed, provide:

a training system configured to train the machine-learning token classifier based on the machine translation result from the machine translation system.

4. The computing system of claim 1 wherein the sequence-based lock/unlock classifier comprises:

a recurrent neural network.

5. The computing system of claim 4 wherein the sequence-based lock/unlock classifier comprises:

a bi-directional recurrent neural network.

6. The computing system of claim 3 wherein the sequence-based lock/unlock classifier comprises:

a Long Short Term Memory (LSTM) network.

7. The computing system of claim 6 wherein the sequence-based lock/unlock classifier comprises:

a bi-directional Long Short Term Memory (BLSTM) network.

8. The computing system of claim 3 wherein the string conversion logic comprises:

locking logic configured to generate the converted string by tagging, in the classified string, the identified tokens with a predefined tag, the machine translation result comprises a translated version of the converted string with the identified tokens tagged by the predefined tag untranslated, and the unlocking logic is configured to generate the translated software string by removing, in the translated version of the converted string, the predefined tag.

9. The computing system of claim 8 wherein the context-dependent token lock classifier logic comprises token identification logic configured to identify the input sequence of tokens by tokenizing the software input string.

10. A computer implemented method, comprising:

receiving a software input string having an input sequence of tokens;

applying a machine-learning token classifier to:

classify a first token in the sequence of tokens as a token to be locked from translation or a token to be translated, based on a second token in the sequence of tokens and the relative positions of the first token and the second token;

classify the second token in the input sequence of tokens as a token to be locked from translation or a token to be translated, based on at least one other token in the input sequence of tokens and relative positions of the second token and the at least one other token;

generate a classification indicator identifying tokens, in the input sequence of tokens, classified as tokens to be locked from translation; and generating a classified string, based on the representation of the software input string, with the classification indicator identifying the tokens to be locked from translation;

converting the classified string into a converted string in which the identified tokens are tagged so that they are locked from translation, based on the classification indicator;

sending the converted string to a machine translation system;

receiving a machine translation result from the machine translation system; and generating, based on the machine translation result, a translated software string in which the identified tokens remain untranslated from the software input string.

11. The computer implemented method of claim 10 and further comprising:

comparing a source language computer software string to a target language computer software string, that is translated from a source language to a target language, to identify a sequence of tokens in the source language computer software string, and untranslated tokens in the target language computer software string;

generating labeled training data indicative of the sequence of tokens in the source language computer software string, the target language computer software string and the identified, untranslated tokens; and training the machine-learning token classifier based on the labeled training data.

12. The computer implemented method of claim 10, and further comprising:

training the machine-learning token classifier based on the machine translation result from the machine translation system.

13. The computer implemented method of claim 10 wherein classifying each token comprises:

classifying each token based on the at least one other token in the sequence of tokens using a recurrent neural network (RNN) classifier.

14. The computer implemented method of claim 13 wherein classifying each token comprises:

classifying each token based on the at least one other token in the sequence of tokens using a bi-directional recurrent neural network (BRNN) classifier.

15. The computer implemented method 12 wherein classifying each token comprises:

classifying each token based on the at least one other token in the sequence of tokens using a Long Short Term Memory (LSTM) network classifier.

16. The computer implemented method of claim 15 wherein classifying each token comprises:

classifying each token based on the at least one other token in the sequence of tokens using a bi-directional Long Short Term Memory (BLSTM) network classifier.

17. The computer implemented method of claim 12 wherein converting the classified string into a converted string comprises:

generating the converted string by tagging, in the classified string, the identified token with a predefined tag, the machine translation result comprises a translated version of the converted string with the identified tokens, tagged by the predefined tag, being untranslated, and further comprising generating the translated software string by removing, in the translated version of the converted string, the predefined tag.

18. The computer implemented method of claim 17 wherein receiving the software input string comprises tokenizing the software input string.

19. A computing system, comprising:

at least one processor; and memory storing instructions executable by the at least one processor, wherein the instructions, when executed, cause the computing system to:

receive a software input string having an input sequence of tokens, the software input string corresponding to a portion of software code;

apply a machine-learning token classifier that classifies a first token in the input sequence of tokens as a token to be locked from translation or a token to be translated, based on a second token in the sequence of tokens and the relative positions of the first token and the second token, and classifies the second token in the input sequence of tokens as a token to be locked from translation or a token to be translated, based on at least one other token in the input sequence of tokens and relative positions of the second token and the at least one other token;

generate a classification indicator identifying tokens classified as tokens to be locked from translation;

generate a classified string, based on the representation of the software input string, including the classification indicator identifying the tokens to be locked from translation;

convert the classified string into a converted string in which the identified tokens are identified so that they are locked from translation, based on the classification indicator;

send the converted string to a machine translation system;

receive a machine translation result from the machine translation system; and generate a translated software suing based on the machine translation result, wherein the identified tokens, in the translated software string, remain untranslated from the software input string.

20. The computing system of claim 19, wherein the machine-learning classifier comprises a neural network that is trained with training data.

* * * * *